United States Patent [19]

Noro et al.

[11] Patent Number: 4,715,673

[45] Date of Patent: Dec. 29, 1987

[54] OPTICAL SWITCH

[75] Inventors: Takanobu Noro, Yokohama; Yasumasa Koakutsu, Fujisawa; Tamio Takeuchi; Masao Yano, both of Yokohama; Seiichi Onoda, Tokorozawa; Hideo Arima, Yohohama; Hitoshi Yokono, Fujisawa; Hirayoshi Tanei, Tokyo, all of Japan

[73] Assignee: Hitachi, Ltd., Tokyo, Japan

[21] Appl. No.: 857,957

[22] Filed: May 1, 1986

[51] Int. Cl.⁴ .................................................. G02B 6/36
[52] U.S. Cl. ............................... 350/96.20; 350/96.15; 350/96.16; 350/96.24
[58] Field of Search ............... 350/96.13, 96.14, 96.15, 350/96.20, 96.27

[56] References Cited

U.S. PATENT DOCUMENTS 4,148,558 4/1979 Schuck ................................ 350/96.2
4,188,708 2/1980 Frederiksen ................. 350/96.15 X

OTHER PUBLICATIONS

Moore et al, "Optical Bypass Switch", *IBM Technical Disclosure Bulletin*, vol. 25, No. 7A, Dec. 1982, pp. 3430–3432.

*Primary Examiner*—John Lee
*Assistant Examiner*—John Ngo
*Attorney, Agent, or Firm*—Antonelli, Terry & Wands

[57] ABSTRACT

An optical switch having a small number of optical connections includes a substrate in which are provided a first light path for conducting optical signals and a second light path consisting of a photosensitive element and light emitting element in pairs. An optical fiber cable is interrupted by the substrate, and optical signals in the fiber cable are transmitted through the first light path or intervened by an electrical system through the second light path in response to the switching movement of the substrate.

12 Claims, 10 Drawing Figures

OPTICAL SWITCH

BACKGROUND OF THE INVENTION

The present invention relates to an optical switch which is compact, inexpensive, and easily fabricated.

A great deal of development is being undertaken for optical telecommunication using optical fibers as a transmission medium, and it is being put into practice aggressively in the fields of public communication trunk lines, power plants, industrial plants, building management systems, office automation (OA), factory automation (FA), and local area networks (LAN). In application of optical communication to these industrial fields, system component parts will soon be required to be of low cost, and therefore it is material to establish the technologies for the miniaturization, simplification of assembly and volume production of component parts and equipment.

Conventionally, system equipment and component parts, such as transmission modules and optical switches, have been manufactured separately for each functional demand. An example of the conventional optical LAN system (loop type) is shown conceptually in FIG. 2, in which a central controller (CPU) 1 distributes data (Optical signals) over an optical transmission fiber cable 2 to a plurality of terminals (ST1-ST5) 4. At each branch point, an optical station 3 is provided individually, which needs to be equipped with an optical switch for transmitting optical signals to the terminal 4 selectively. The conventional optical switch, as shown by reference number 5 in FIG. 3, is equipped separately from and in front of an optical transmission module 7 including a photosensitive element 8 and light emitting element 9. In FIG. 3, further reference number 6 denotes a light path selector in the optical switch 5, number 10 denotes an interfacing logical converter, number 11 denotes an optical input signal, 12 denotes an optical output signal, 13 denotes optical couplers connecting the optical switch 5 and optical transmission module 7, and number 14 denotes a switching signal line for operating the optical switch 5. The junctions between the transmission fiber cable 2 and optical switch 5 and between the optical switch 5 and optical transmission module 7 necessitate the optical connection, which increases in number as the number of terminal units 4 in the optical LAN system increases. However, optical connections which often require a difficult work for resistering optical axes and the like are preferably as small in number as possible in constructing an optical LAN system. A larger number of connections, as in the case of FIG. 3, imposes restrictions on the transmission distance and the number of terminal units installed in the system, and also problems of increased cost of the switch periphery component parts and increased optical coupling loss.

A prior art optical switch of this kind has employed a mechanism (prism) as disclosed, for example, in Japanese Patent Laid-open Publication No. 57-139704, however, the prism mechanism for light path switching has required a significant space and hampered the compactness.

A prior art optical transmission module disclosed in Japanese Patent Laid-open Publication No. 55-117114 has been arranged separately for the optical circuit including lenses, etc. and the electrical circuit, and therefore it has been difficult to mount the optical switch directly on the module section or to accommodate the module within the optical switch.

SUMMARY OF THE INVENTION

The present invention is intended to improve the foregoing prior art deficiencies, and its prime object is to provide a compact, inexpensive, and easily fabricated optical switch.

Another object of this invention is to provide an optical communications system using the optical switch which allows self diagnosis for the terminal unit.

The present invention resides characteristically in the arrangement including a first light path for propagating the optical signal and a second light path consisting of an aligning photosensitive element and light emitting element disposed on a common substrate, which is moved relative to light path members such as optical fibers located on both sides thereof so that one of the first and second light paths is selected. While the first light path couples with the optical fibers, the second light path is looped through another light path member with the intention of allowing self diagnosis for the terminal unit.

DESCRIPTION OF THE PREFERRED EMBODIMENTS

The present invention will now be described in detail with reference to the drawings.

Figure 3:
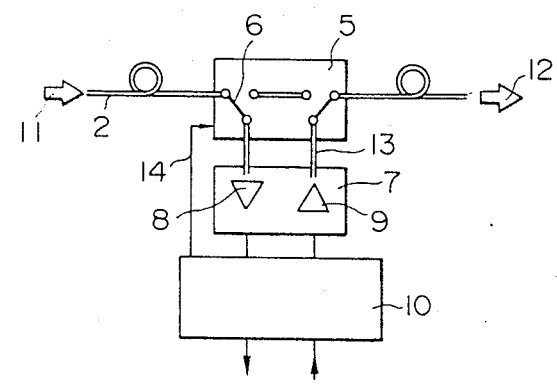
FIG. 3 is a diagram showing the conventional optical coupling.
Figure 4:
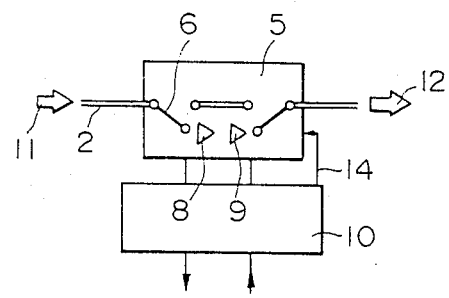
FIG. 4 is a diagram showing conceptually the inventive optical switch.

FIG. 4 shows the concept of this invention, and provides comparison with the conventional arrangement shown in FIG. 3. The optical switch 5 is designed to accommodate therein an optical transmission module made up of a photosensitive element 8 and a light emitting element 9, with the intention of integrating both functions of the optical transmission module and optical switch in a compact structure.

Figure 5A:
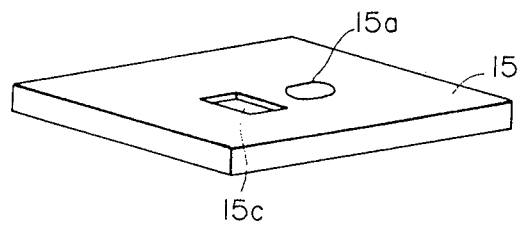
FIGS. 5A and 5B are a set of perspective views of the substrate used in the arrangement of FIG. 1.

In FIG. 5A, a substrate 15 is made of alumina, for example, and it has the formation of a circular through hole 15a serving for the first light path and rectangular recesses 15b and 15c on both sides of the substrate as shown in FIG. 6, in which the photosensitive element 8 and light emitting element 9 are seated.

Certain wirings 18 are made on both sides of the substrate 15 by the thick film forming process, for example. Printed wirings are made using Au paste for the mounts of the photosensitive element 8, light emitting element 9 and integrated drive circuit 17, and using Ag-Pd paste for the lead pin mounts. The substrate is baked at 800° C. for 10 minutes (1-hour cycle), for example, in a belt furnace to complete the wiring of the module.

The circular hole 15a in the wired substrate 15 is filled with a bored cylindrical press-fit (solidified glass frit). The inner diameter of the press-fit is determined from the outer diameters of the face plate (FP), light guide (LG), lod lens and spherical lens constituting a waveguide 16 serving for the first light path. The waveguide 16 is inserted in the bore of the press-fit, and it is heated at 500° C. for 20 minutes (2-hour cycle) in a belt furnace. Then, the waveguide 16 is completely fixed to the press-fit by its fusion and solidification, and an opto-electric hybrid substrate is completed.

Next, the photosensitive element 8 is fixed in the rectangular recess 15b on one side of the substrate 15 using an Au-Sn bonding material in the environment of 220° C. for 5 minutes, and the light emitting element 9 is fixed in the rectangular recess 15c on another side of the substrate using the same bonding material at 200° C. for 5 minutes. Consequently, the two elements 8 and 9 are connected to the wirings on the substrate 15.

An integrated drive circuit (not shown) is fixed on the substrate on the side of the photosensitive element 8 and another integrated drive circuit 17 is fixed on the side of the light emitting element 9 using an Ag-epoxy bonding material in the environment of 160° C. and 150° C., respectively, for 5 minutes. These elements 8, 9 and 17 are wired using Au wires by the wire-bonding process, and the electrical circuit section of the module is completed.

Figure 5B:
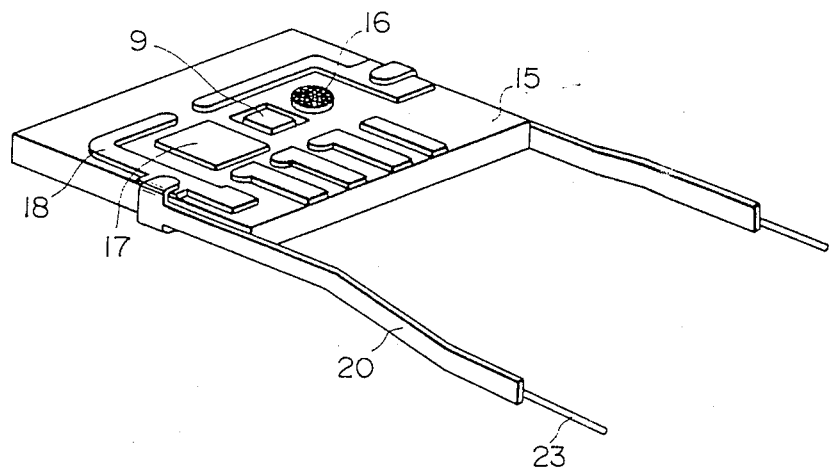

Lead frames 20 which also function as flat springs are fixed on both edges of the substrate 15 using an Au-Sn bonding material as shown in FIG. 5B.

Figure 1:
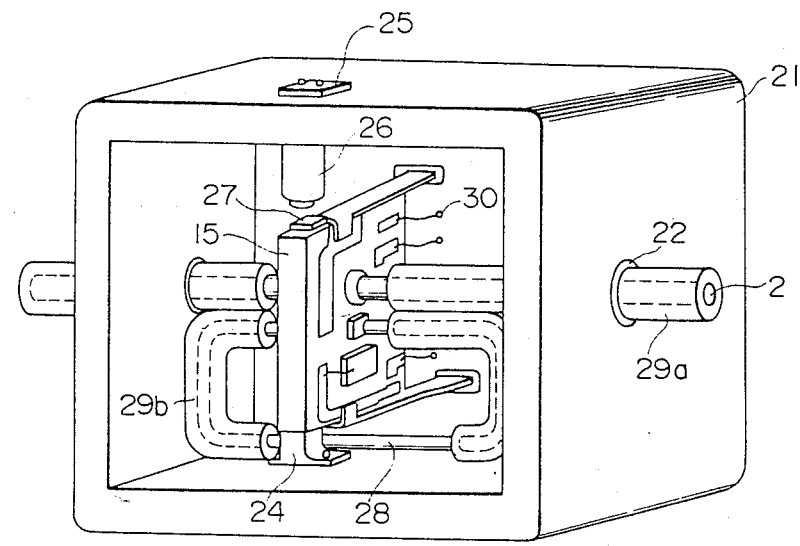
FIG. 1 is a perspective view showing the interior of the optical switch according to the present invention.
Figure 2:
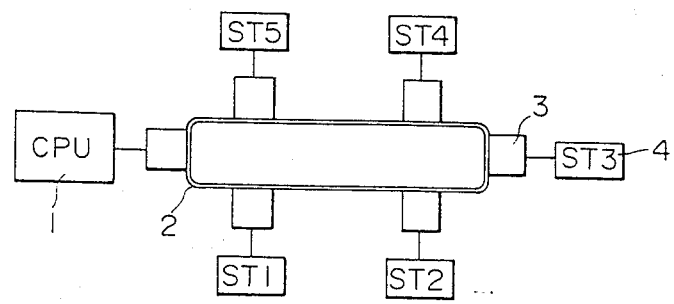
FIG. 2 is a diagram showing a general optical communications system.

The substrate 15 which has been subassembled as described above is mounted in a switch box 21 by being supported by the lead frames 20, as shown in FIG. 1. The switch box 21 is made of plastics, and consists of a housing and a lid (not shown). Fiber guides 29a are provided through both side walls, an optical switch stopper 24 is fixed on the bottom wall, and a driving magnet 26 is fixed on the upper wall. Further provided in the arrangement of FIG. 1 are hermetic seal 22, a switch operating terminal 25, a magnetic member 27 afixed on the substrate 15, a looping optical fiber 28 bent in virtually a C-shape, and another fiber guide 29b.

After the substrate 15 has been seated in the switch box 21, electrical connection is made for input/output terminals 30, and optical fiber cables 2 are inserted into the fiber guides 29a.

The optical switch incorporating the optical transmission module is assembled in this way, and it is subjected to the final fine adjustment for the optical system (in x, y and z directions) between the light paths on the module and two fiber cables. After the switch box has been dried and filled with nitrogen gas, it is hermetically sealed using epoxy resin, and the optical switch is completed.

Figure 6A:
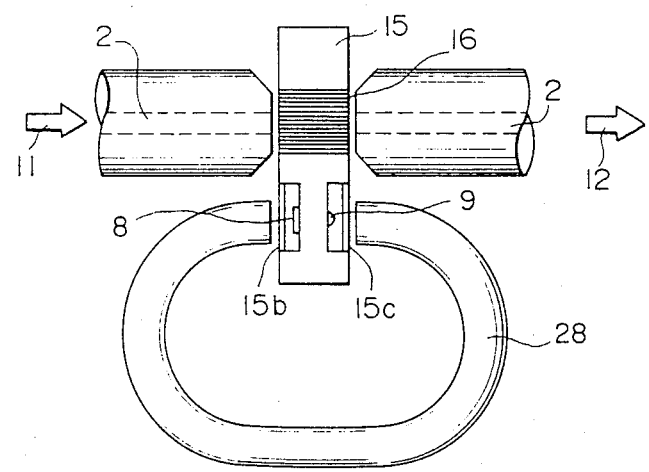
FIGS. 6A and 6B are a set of partial front views showing two set positions of the substrate.

The following describes the operation of the inventive optical switch with reference to FIGS. 1 and 6. FIGS. 1 and 6A show the state of the optical switch when its driving magnet 26 is deactivated (bypass mode), in which an optical signal 11 coming from the left in the figure is propagated through the optical waveguide 16 in the substrate 15 and delivered to the optical fiber cable 2 on the right. An optical signal produced by the light emitting element 9 in the test mode of the terminal unit is conducted through the looping fiber 28 and received by the photosensitive element 8, thereby allowing self diagnosis such as bit verification.

Figure 6B:
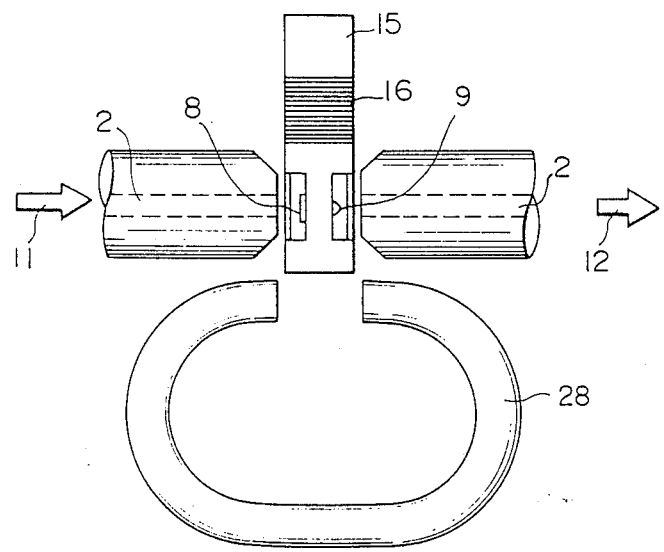

When the terminal unit is intended to receive signals from the optical LAN, the driving magnet 26 is activated so that the substrate 15 is pulled up (normal mode) as shown in FIG. 6B. The optical signal 11 becomes incident to the photosensitive element 8, and the terminal unit receives the signal. The terminal unit samples necessary data in the signal and applies unnecessary portions of the signal back to the fiber cable communication network through the light emitting element 9.

As an example of the test mode operation, the following describes the self diagnosis of the terminal unit which is conducted at initiation to test whether the terminal unit operates normally for data transmission and reception. Before the terminal unit is started up, the substrate 15 is placed at the bypass mode position as shown in FIGS. 1 and 6A, allowing the optical signal 11 to go through the optical waveguide 16. Namely, the idling terminal unit is not involved in signal transmission/reception, and the optical signal 11 coming from one optical fiber cable 2 is conducted through the optical waveguide 16 to another optical fiber cable 2. This bypass mode continues in the initial phase of the terminal unit operation, and during the period a diagnostic pattern signal is generated by the unit itself. The diagnostic pattern signal is emitted optically by the light emitting element 9 and it is propagated through the looping fiber 28 and received by the photosensitive element 8. The terminal unit tests the received data on a comparison basis with the original data and determines the start-up normality of the terminal unit. Upon determination of the normal start-up of the terminal unit, the driving magnet 26 is energized, and the substrate 15 is moved to the position shown in FIG. 6B. The bypass mode is switched to the normal code, and the optical signal 11 from the left optical fiber cable 2 is received by the photosensitive element 8 and delivered electrically to the terminal unit. An electrical signal produced in the terminal unit is transformed into an optical signal by the light emitting element 9, and it is transmitted over the right optical fiber cable 2. If, on the other hand, the data comparison process results in the detection of abnormality, it is alerted to the terminal unit, and the unit stays in the bypass mode of FIG. 6A until the normal test result is recovered.

Although in the foregoing embodiment a piece of substrate 15 mounts a set of optical component parts (optical waveguide 16, photosensitive element 8 and light emitting element 9), the present invention is not limited to this, but a piece of substrate may be designed to mount several sets of optical component parts so that the light paths of these sets are switched concurrently.

Figure 7A:
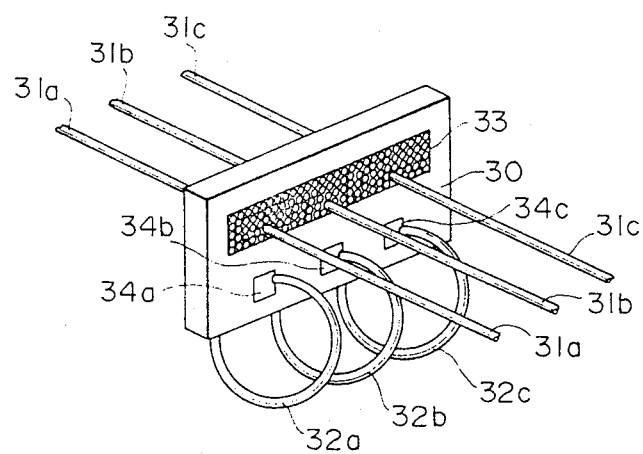
FIGS. 7A and 7B are a set of partial perspective views showing two set positions of the substrate according to another embodiment of this invention.
Figure 7B:
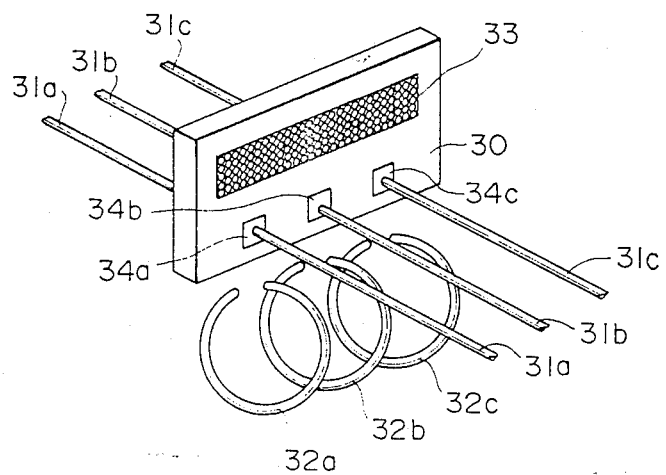

FIG. 7 shows an embodiment of this invention, in which three sets of optical component parts are mounted on one substrate 30, with FIG. 7A showing the state of the bypass mode, while FIG. 7B showing the normal mode. The figures show only optical component parts, and wirings on the substrate and the drive mechanism are omitted for clarifying the drawings.

Shown in FIGS. 7A and 7B three sets of optical fiber cables 31a, 31b and 31c, each set being in alignment, and three looping fibers 32a, 32b and 32c bent in a C-shape. As in the previous embodiment shown in FIG. 6, the substrate 30 is movable across the distance between the optical fiber cable and looping fiber, and it is provided therein with a rectangular face plate 33, three light emitting elements 34a, 34b, 34c, and three photosensitive elements (located behind the light emitting elements and not shown in the figure). The face plate 33 is an assembly of a number of thin optical fibers each forming an independent light path without interference from one another, as in the case of the one shown in FIG. 5B. Accordingly, one face plate 33 can be shared by three sets of optical fiber cables 31a, 31b and 31c for the conduction of three optical signals without a fear of interference. The embodiment of FIG. 7 allows switching of three light paths by the movement of the single substrate 33 efficiently, and this contributes to the reduction of dimensions of the optical switch.

Although in the foregoing embodiment the substrate is moved by means of a driving magnet, various other drive systems such as that using the torque of a motor can equally be employed.

According to the present invention, as described above in detail, the number of optical couplings can be minimized, whereby a compact and inexpensive optical switch can be accomplished. Such effectiveness is the result of arrangement of both optical and electrical circuit systems on a substrate which is moved for the switching operation, and this scheme enables one set position of the switch to be used for the self diagnosis of the terminal unit.

What is claimed is:

1. An optical switch comprising:
   first and second light path members disposed to confront each other;
   a substrate located between said first and second light path members;
   an optical waveguide fitted in said substrate substantially in parallel to a line connecting said first and second light path members;
   a light emitting element fixed in proximity to said optical waveguide on one side of said substrate, said light emitting element being in optical coupling with said first light path member;
   a photosensitive element fixed oppositely to said light emitting element on another side of said substrate, said photosensitive element being in optical coupling with said second light path member;
   a drive means for moving said substrate at least between two positions so that said optical waveguide or said elements are positioned between said first and second light path members; and
   a looping light path member for coupling said light emitting element with said photosensitive element optically when said optical waveguide is positioned between said first and second light path members.

2. An optical switch according to claim 1, wherein said optical waveguide comprises a face plate made up of an assembly of thin optical fibers.

3. An optical switch according to claim 1, wherein said looping light path member has the ends thereof spaced from said substrate, said drive means moving said substrate between a first position in which said light emitting element and said photosensitive element are positioned between said first ad second light path members and a second position in which said optical waveguide is positioned between said first and second light path members and said light emitting element and said photosensitive element element are positioned for optical coupling with respective ends of said looping light path member for enabling self-diagnosis.

4. An optical switch according to claim 3, wherein said looping path member has the confronting ends thereof spaced apart so as to enable said substrate and said light emitting and photosensitive elements to be positioned therebetween in said first position of said substrate for enabling self-diagnosis.

5. An optical switch comprising:
   a plurality of sets of first and second light path members, members of each set being disposed to confront each other;
   a substrate located between said first light path members and said second light path members;
   an optical waveguide fitted in said substrate substantially in parallel to lines connecting said first light path members and said second light path members;
   a plurality of light emitting elements each fixed in proximity to said optical waveguide on one side of said substrate, each said light emitting element being in optical coupling with one of said first light path members;
   a plurality of photosensitive elements each fixed oppositely to a corresponding light emitting element on another side of said substrate, each said photosensitive element being in optical coupling with a corresponding one of said second light path members;
   a drive means for moving said substrate at least between two positions so that said optical waveguide or each set of said light emitting elements and photosensitive elements is positioned between each ones of said first and second light path members; and
   a plurality of looping light path members for coupling said light emitting elements and corresponding photosensitive elements optically when said optical waveguide is positioned between said first and second light path members.

6. An optical switch according to claim 5, wherein said optical waveguide comprises a face plate made up of an assembly of thin optical fibers.

7. An optical switch according to claim 5, wherein each of said looping light path members has the ends thereof spaced from said substrate, said drive means moving said substrate between a first position in which said plurality of said light emitting elements and said plurality of said photosensitive elements are positioned between said plurality of sets of said first and second light path members and a second position in which said optical waveguide is positioned between said plurality of sets of said first and second light path members and said plurality of said light emitting elements and said plurality of said photosensitive elements are positioned for optical coupling with respective ends of said looping light path members for enabling self-diagnosis.

8. An optical switch comprising:
   first and second light path members disposed to confront each other;
   a looping light path member positioned in proximity to said first and second light path members, both ends of said light path member being disposed to confront each other;
   a movable substrate located between said first and second light path members;
   an optical waveguide fitted in said substrate substantially in parallel to a line containing said first and second light path members;
   a light emitting element fixed in proximity to said optical waveguide on one side of said substrate, said light emitting element being arranged for optical coupling with one of said first light path member and one end of said looping light path member;

a photosensitive element fixed oppositely to said light emitting element on another side of said substrate, said photosensitive element being arranged for optical coupling with one of said second light path member and another end of said looping light path member; and drive means for moving said substrate at least between first and second positions so that one of said optical waveguide and said light emitting and photosensitive elements are positioned between said first and second light path members, said light emitting and photosensitive elements being optically coupled to said looping light path member only when said optical waveguide is positioned between said first and second light path members in said first position of said substrate.

9. An optical switch according to claim 8, wherein said looping light path member is a looping optical fiber.

10. An optical switch comprising:
a plurality of sets of first and second light path members, members of each set being disposed to confront each other;

a plurality of looping light path members, each of said looping light path members being positioned in proximity to said respective sets of first and second light path members, both ends of each of said looping light path members being disposed to confront each other;

a movable substrate located between plurality of sets of said first light path members and said second light path members;

an optical waveguide fitted in said substrate substantially in parallel to lines connecting respective sets of said first light members and said second light path members;

a plurality of light emitting elements, each of said light emitting elements being fixed in proximity to said optical waveguide on one side of said substrate and being arranged for optical coupling with respective ones of said first light path members and an end of respective ones of said looping light path members;

a plurality of photosensitive elements, each of said photosensitive elements being fixed oppositely to a corresponding light emitting element on another side of said substrate, each of said photosensitive elements being arranged for optical coupling with a respective one of a corresponding one of said second light path members and a respective another end of a corresponding one of said looping light path members;

drive means for moving said substrate at least between first and second positions so that one of said optical waveguide and each set of said light emitting elements and photosensitive elements is positioned between respective ones of said plurality of sets of said first and second light path members, and said light emitting elements and corresponding photosensitive elements are coupled optically to said looping light path members only when said optical waveguide is positioned between said plurality of sets of said first and second light path members in said first position of said movable substrate.

11. An optical switch according to claim 10, wherein said looping light path members are looping optical fibers.

12. An optical switch according to claim 10, wherein each of said looping path members has the confronting ends thereof spaced apart so as to enable said substrate and respective ones of said plurality of light emitting and photosensitive elements to be positioned therebetween in said first position of said substrate for enabling self-diagnosis.

* * * * *